United States Patent
Clark et al.

(10) Patent No.: US 10,496,376 B2
(45) Date of Patent: Dec. 3, 2019

(54) RANDOM NUMBER GENERATOR

(71) Applicant: Massachusetts Institute Of Technology, Cambridge, MA (US)

(72) Inventors: Harry R. Clark, Townsend, MA (US); Theodore M. Lyszczarz, Concord, NH (US)

(73) Assignee: Massachusetts Institute of Technology, Cambridge, MA (US)

(*) Notice: Subject to any disclaimer, the term of this patent is extended or adjusted under 35 U.S.C. 154(b) by 270 days.

(21) Appl. No.: 15/493,832

(22) Filed: Apr. 21, 2017

(65) Prior Publication Data

US 2019/0235839 A1  Aug. 1, 2019

(51) Int. Cl.
*G06F 7/58* (2006.01)

(52) U.S. Cl.
CPC .................................. *G06F 7/588* (2013.01)

(58) Field of Classification Search
CPC ... G01T 1/16; G01T 1/17; G01T 1/172; G06F 7/588
See application file for complete search history.

(56) References Cited

U.S. PATENT DOCUMENTS

| | | | | |
|---|---|---|---|---|
| 4,833,633 A | * | 5/1989 | Morris | G06E 1/02 708/250 |
| 5,987,483 A | * | 11/1999 | Edelkind | G06F 7/588 708/250 |
| 6,215,874 B1 | | 4/2001 | Borza et al. | |
| 6,249,009 B1 | * | 6/2001 | Kim | G06F 7/588 250/580 |
| 6,415,309 B1 | | 7/2002 | Shilton | |
| 6,697,829 B1 | | 2/2004 | Shilton | |
| 7,519,641 B2 | * | 4/2009 | Ribordy | G06F 7/588 708/255 |
| 2003/0018674 A1 | * | 1/2003 | Figotin | G06F 7/588 708/250 |

OTHER PUBLICATIONS

International Search Report and Written Opinion dated Jan. 12, 2018 in corresponding PCT application No. PCT/US17/28846.
(Continued)

*Primary Examiner* — Marcus H Taningco
(74) *Attorney, Agent, or Firm* — Nields, Lemack & Frame, LLC

(57) ABSTRACT

A novel system for generating random numbers is disclosed. The radioactive source emits photons, which causes the release of electrons on the surface of the detector. The detector is configured as a two dimensional array having a plurality of pixels. This release of electrons creates a splatter pattern on the detector, which is then read by the processor. Subsequent photon emissions create a second splatter pattern, which is then read by the processor. The processor compares these two splatter patterns, and generates random numbers based on these two splatter patterns. In certain embodiments, the processor creates a difference matrix which represents a comparison of the two splatter patterns. The processor then classifies each pixel in the difference matrix in accordance with certain rules. In certain embodiments, these classification rules may vary as a function of time or as a function of where on the detector the pixel is disposed.

18 Claims, 7 Drawing Sheets

(56) References Cited

OTHER PUBLICATIONS

"Introducing a Perfect Security Solution: Super Fast Micro Quantum Random Number Generator," EYL Partners, accessed Jul. 20, 2017, http://www.eylpartners.com/default/eng/eng_info01.php.

"True" vs. pseudo-random numbers,' Wikipedia, accessed Jul. 20, 2017, https://en.wikipedia.org/wiki/Random_number_generation#.22True.22_vs__pseudo-random_numbers.

"HotBits: Genuine Random Numbers, Generated by Radioactive Decay," accessed Jul. 20, 2017, http://www.fourmilab.ch/hotbits/.

"HotBits Hardware," accessed Jul. 20, 2017, http://www.fourmilab.ch/hotbits/hardware3.html.

* cited by examiner

RANDOM NUMBER GENERATOR

This invention was made with Government support under Contract No. FA8721-05-C-0002 awarded by the U.S. Air Force. The Government has certain rights in the invention.

FIELD

This disclosure relates to a random number generator, and more particularly to a random number generator based on the electron emission pattern from a radioactive source.

BACKGROUND

Random number generators are useful in a variety of industries, ranging from national defense to the gaming industry. However, it is difficult to produce truly random numbers.

For example, many computer programs profess to have a random number function. However, these programs are not random, but pseudo-random. In many cases, these random number functions are seeded with an arbitrary value, such as the time of day. Once seeded, these random number generators perform a known sequence of operations to obtain the next random number. This continues for each requested number. In other words, while appearing to be random, the output of these random number generators is actually deterministic and predictable.

A truly random number has certain properties. Truly random numbers are not deterministic, are not predictable and are not biased toward any particular value or range of values. In other words, over an extended period of time, a truly random number generator has a uniform distribution, that is, there is an equal probability of outputting any value.

One accepted method of generating random numbers is the measurement of radioactive decay. Specifically, the time between successive decays of a radioactive compound is measured, such as by a Geiger counter. This duration is used in the creation of the random number. However, this method is slow and tedious, as the rate of decay may be very slow.

Therefore, it would be beneficial if there were system for generating truly random numbers that produces outputs at a high rate. Further, it would be advantageous if this system was also cost effective and easy to manufacture.

SUMMARY

A novel system for generating random numbers is disclosed. The system includes a radioactive source, a detector and a processor. The radioactive source emits photons, which causes the release of electrons in the detector. The detector is configured as a two dimensional array having a plurality of pixels. This release of electron creates a splatter pattern on the detector, which is then read by the processor. Subsequent photon emissions create a second splatter pattern, which is then read by the processor. The processor compares these two splatter patterns, and generates random numbers based on these two splatter patterns. In certain embodiments, the processor creates a difference matrix which represents a pixel-by-pixel comparison of the two splatter patterns. The processor then classifies each pixel in the difference matrix in accordance with certain rules. In certain embodiments, these classification rules may vary as a function of time or as a function of where on the detector the pixel is disposed.

BRIEF DESCRIPTION OF THE DRAWINGS

For a better understanding of the present disclosure, reference is made to the accompanying drawings, which are incorporated herein by reference and in which.

DETAILED DESCRIPTION

The present disclosure uses a radioactive source as the entropy source for the random number generator.

Radioactive decay is universally recognized to be a random event. Further, radioactive decay is not subject to voltage or temperature dependence.

However, unlike other random number generators that rely in the time interval between decay events, the present system utilizes the pattern of electrons created on a detector by the release of a photon during a decay event.

Specifically, some radioactive elements, such as Fe55, emit photons whenever a decay event occurs. Fe55 decays by a process known as electron recapture, where an electron in an inner orbit is captured by the nucleus. This captured electron joins with a proton in the nucleus and converts it to a neutron. This results in a reduction in atomic number, but no change in atomic mass. Thus, electron recapture causes the slow transition of Fe55 to Mn55. When the electron is captured by the nucleus, another electron located in an outer orbit replaces the captured electron in the inner orbit. Since this orbit is a lower energy level, this movement of the second electron causes a release of energy in the form of a photon. The amount of energy releases is predictable, as it is related to the difference in energy levels between the two electron orbits of the radioactive element. These photons cause the generation of electrons on the surface of a substrate, such as silicon. While the number of electrons released is nearly fixed based on the energy of the photon, the location of these electrons varies for each decay event. For example, for Fe55, about 1620 electrons are released in a silicon substrate for every photon emitted. However, the exact location where those electrons are released is random.

Other elements may undergo a different process. For example, cesium is a beta emitter. During radioactive decay, a neutron in the nucleus is transformed into a proton and an electron is ejected. Later, a photon is ejected. Like Fe55, this photon may generate electrons on the surface of a substrate, where the pattern of electrons is random. Thus, the specific reaction that the radioactive source undergoes is not critical; rather it is the spontaneous release of photons that is of interest.

Figure 1:
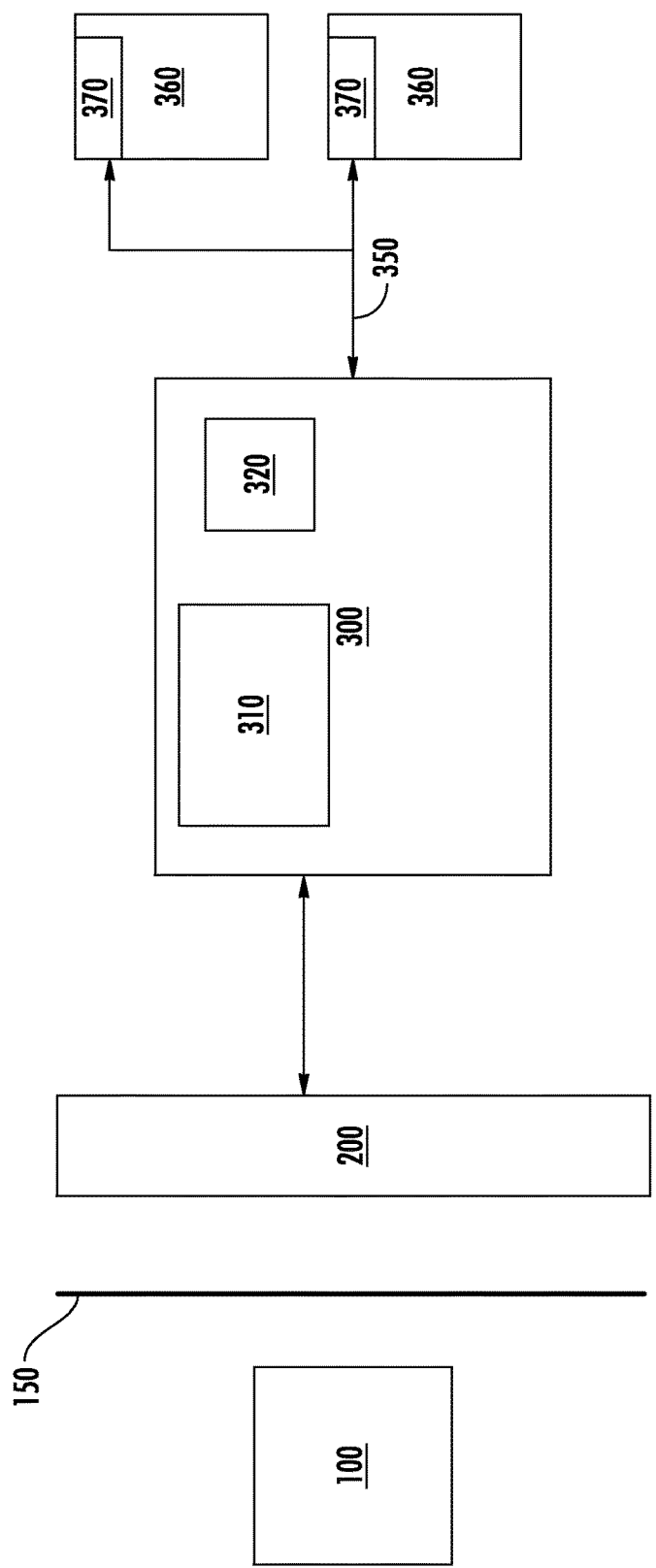
FIG. 1 shows a system for generating random numbers according to one embodiment.

Unlike earlier random number generators, the present system makes use of the pattern created by these electrons. FIG. 1 shows one embodiment of the present system. The system includes a radioactive source 100, a detector 200 and a processor 300. In certain embodiments, a shutter 150 may be disposed between the radioactive source 100 and the detector 200.

The radioactive source 100 may be any suitable element, such as Fe55, Cd109, Cs137 and others. In certain embodiments, Fe55 is used due to its relatively long half-life (2.7 years) and its relative safety. In certain embodiments, the radioactive source 100 may be in the form of a foil.

The shutter 150 may be used to periodically expose the detector 200 to the radioactive source 100. However, in other embodiments, a shutter 150 is not employed.

The detector 200 may be any suitable sensor. In certain embodiments, the detector 200 may be a charge coupled device (CCD). In other embodiments, the detector 200 may be a CMOS detector. The detector 200 contains a surface having a plurality of locations, known as pixels, which are arranged in a two-dimensional array. The size of the array is not limited by the disclosure, and may be, for example, 2048×2048, although other sizes are also possible. The underlying substrate of the detector 200 may be silicon.

The processor 300 may include a processing unit 310 and a memory device 320. The processing unit 310 may be any suitable processing unit, including but not limited to a general purpose computer, a special purpose controller, a personal computer or server, or an embedded processor. The memory device 320 is in communication with the processing unit 310, and contains the instructions to be executed by the processing unit 310. These instructions, when executed by the processing unit 310, enable the random number generator to perform the functions described herein. The memory device 320 may be any suitable memory device, such as a FLASH ROM, a mask ROM, a dynamic memory (DRAM), a volatile memory (RAM), a magnetic storage device, an optical storage device, or any other type. In certain embodiments, the memory device 320 also includes a writable portion such that data and other temporary or changing information may also be stored.

The processor 300 also has at least one input to allow it to be in communication with the detector 200. In this way, the processor 300 is able to read the contents of the detector 200, as described in more detail below.

In certain embodiments, the processor 300 may be incorporated in the detector 200. For example, the detector 200 may include the processing capability to perform the thresholding and creation of difference matrices described herein. Thus, although FIG. 1 shows the processor 300 as being physically separate from the detector 200, it is understood that both functions may be included in one component.

One or more users 360 may be in connection with the processor 300 so as to receive random numbers transmitted by the processor 300. In some embodiments, only one user may be in communication with the processor 300, while in other embodiments, a plurality of users may be in communication with the processor 300. For example, in certain embodiments, the processor 300 may be in communication with a network 350 which allows it to transmit the random numbers to remotely located users 360.

When a photon is emitted from the radioactive source 100, it causes the release of electrons in the detector 200. As noted above, the number of electrons released may be fixed. For example, 1620 electrons are released by a silicon substrate by a photon emitted from a Fe55 decay event. These electrons may be released on any region of the detector 200.

The pattern created by the release of the electrons will be referred to in this disclosure as a splatter pattern. As noted above, the splatter pattern created by each photon emission is unique. The present system utilizes this attribute in generating random numbers.

As described above, the detector 200 may have over four million pixels, where only a small number of these pixels may be affected by the photon emission. When a pixel is affected by the photon emission, its value may change from a default level to an excited level. In the case of digital values, the value of the pixel may change from a "0" to a "1". In the case of analog values, the value of the pixel may increase from a very low value to a much higher value. For example, the analog value of each pixel may range from 0 to an arbitrary maximum value. It is the change in the value of each pixel that defines the splatter pattern.

Because such a low percentage of the pixels are affected by the photon emission, rather than using the splatter pattern as a random number, the present system relies on the differences between two splatter patterns to create a random number.

For example, one or more photon emissions may generate a first splatter pattern. This splatter pattern is captured by the processor 300. In certain embodiments, the act of reading the splatter pattern from the detector 200 causes the pixels in the detector 200 to return to their default value. Specifically, when a pixel or a row of pixels is read by the processor 300, the values for that pixel or row of pixels returns to a default value. Later, one or more subsequent photon emissions generate a second splatter pattern. The processor 300 then reads this second splatter pattern at a later time. The difference between these two splatter patterns is used to generate a random number.

Each splatter pattern may be created by one or more photon emissions. Further, different splatter patterns may be created from different numbers of photon emissions. In other words, in a first time interval, the radioactive source 100 may emit three photons. These three photons create a first splatter pattern. During the next time interval, the radioactive source 100 may emit five photons, due to the randomness of the radioactive source. These five photon emissions are used to create the second splatter pattern. Thus, a splatter pattern is created by a set of photon emissions, where the set may include one or more photon emission. Further, the number of photons in a set may vary between splatter patterns.

The generation of random numbers may be achieved in a variety of ways. In one embodiment, the processor 300 compares the first splatter pattern to the second splatter pattern. Any pixel which has the same value in both splatter patterns is discarded. In other words, if a pixel was not affected by either set of photon emissions, it is discarded. Similarly, if a pixel was affected by both sets of photon emissions, it is also discarded. Further, if the difference in the two analog values is less than a predetermined threshold, the pixel is discarded. A pixel that was affected by the first set of photon emissions, but not the second set of photon emissions may be classified as a "0" or a "1". Conversely, if a pixel was not affected by the first set of photon emissions, but was affected by the second set of photon emissions, it is given the opposite value.

Figure 2A:
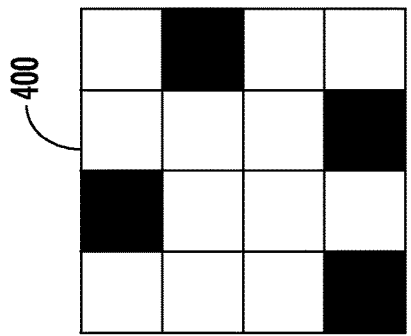
FIGS. 2A-2C show a first set of images, including two splatter patterns and a difference matrix, respectively.
Figure 2B:
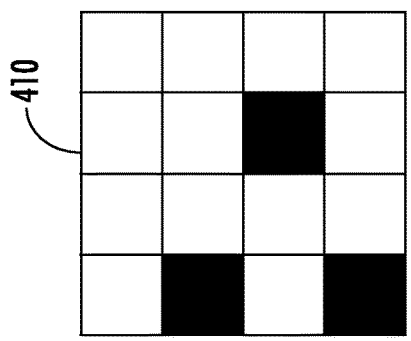
Figure 2C:
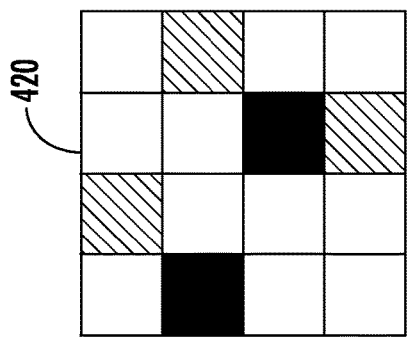

For example, FIGS. 2A-2C show an illustration of this technique. In each figure, the detector is assumed to be a 4×4 array. For simplicity, the pixels are represented by digital values. However, the technique and explanation are equally applicable to pixels that utilize analog values, as described above.

FIG. 2A shows a first splatter pattern 400 on the detector 200 after a first set of photon emissions. In FIG. 2A, a total of four pixels have excited or elevated levels. FIG. 2B shows a second splatter pattern 410 on the detector 200 after a second set of photon emissions. In FIG. 2B, only three pixels have excited or elevated levels. Both of these splatter patterns 400, 410 are read by the processor 300 and stored in the memory device 320.

FIG. 2C shows a difference matrix 420. This image may be created in the memory device 320 of the processor 300. In this image, pixels which have the same value in both splatter patterns 400, 410 are shown in white. The pixels that are part of the first splatter pattern 400, but not part of the second splatter pattern 410 are shown in cross-hatch. The pixels that are not part of the first splatter pattern 400, but are part of the second splatter pattern 410 are shown in black.

If the difference matrix 420 shown in FIG. 2C is read from left-to-right and from top-to-bottom, a bitstream having a value of 01010 is obtained. This assumes that black pixels were considered to be "1" and cross-hatched pixels were considered to be "0". As stated above, all white pixels are simply discarded.

Figure 3A:
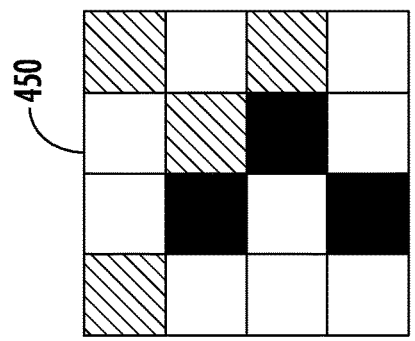
FIGS. 3A-3C show a second set of images, including two splatter patterns and a difference matrix, respectively.
Figure 3B:
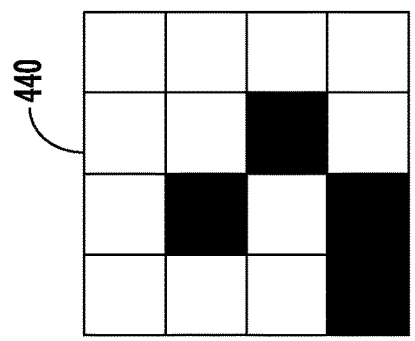
Figure 3C:
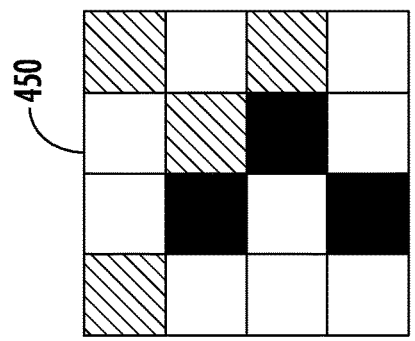

A second example is shown in FIGS. 3A-3C. As before, FIG. 3A represents the splatter pattern 430 after a first set of photon emissions, while FIG. 3B represents the splatter pattern 440 after a second set of photon emissions. In this embodiment, five pixels were affected in splatter pattern 430 and four pixels were affected in the second splatter pattern 440. FIG. 3C shows the difference matrix 450, which may be created in the memory device 320. In this case, a bitstream having a value of 0010101 is obtained.

Note that the size of the bitstream created by the difference matrix is not necessarily the same for each difference matrix. The difference matrix 420 in FIG. 2C formed a 5 bit value, while the difference matrix 450 of FIG. 3C produces a 7 bit value.

One method to address this is to concatenate the values obtained from various difference matrices. For example, it 8 bit random numbers are desired, the 5 bits from difference matrix 420 may be concatenated with the first 3 bits from the difference matrix 450 to form an 8 bit value. The remaining bits from the difference matrix 450 may be used as the first part of the next random number. Of course, in other embodiments, the bitstream contains far more bits. In this embodiment, the bitstream may be separated into a plurality of smaller random numbers. For example, a bitstream of 31 bits may be used to create three 8-bit random numbers. The remaining 7 bits may be concatenated with the bitstream from a subsequent difference matrix to form a fourth 8-bit random number.

It is important to note that while the above examples show 4×4 detectors and difference matrices that have few bits, actual detectors 200 contain more pixels and create difference matrices having significantly more bits. For example, if the splatter patterns created by two photon emissions for Fe55 were mutually exclusive, a bitstream having up to 3240 random bits may be generated.

Thus, in this embodiment, random numbers are generated by performing a pixel-by-pixel comparison of two splatter patterns created by different sets of photon emissions. The result of this pixel-by-pixel comparison of two different splatter patterns may be referred to as a difference matrix. The results of each pixel comparison yield a value of "0", a value of "1", or a discarded pixel. The value of random numbers is then obtained by reading the difference matrix as a bitstream. As described above, the difference matrix may be read left-to-right and top-to-bottom. However, the difference matrix can be read in any fashion. For example, the difference matrix may be read top-to-bottom and left-to-right, right-to-left and bottom-to-top, or in any other orientation.

As described above, the values of each pixel may be digital or analog. FIGS. 2A-2C and 3A-3C assume digital values, where pixels in the splatter patter have one of two possible values. However, for analog values, a much wider range of values may be assumed by each pixel. Thus, in the case of analog values, a threshold may be incorporated to determine whether a pixel is considered to have been affected differently by the two sets of photon emissions. Specifically, the splatter patterns of FIGS. 2A-2C and 3A-3C may each be a two dimensional array of values. The difference matrix would then be created by subtracting, for each pixel in the two dimensional array, the value in the second splatter pattern from the value in the first splatter pattern. This results in a difference matrix where each pixel has a value between the maximum analog value and the negative value of this maximum analog value.

Figure 4:
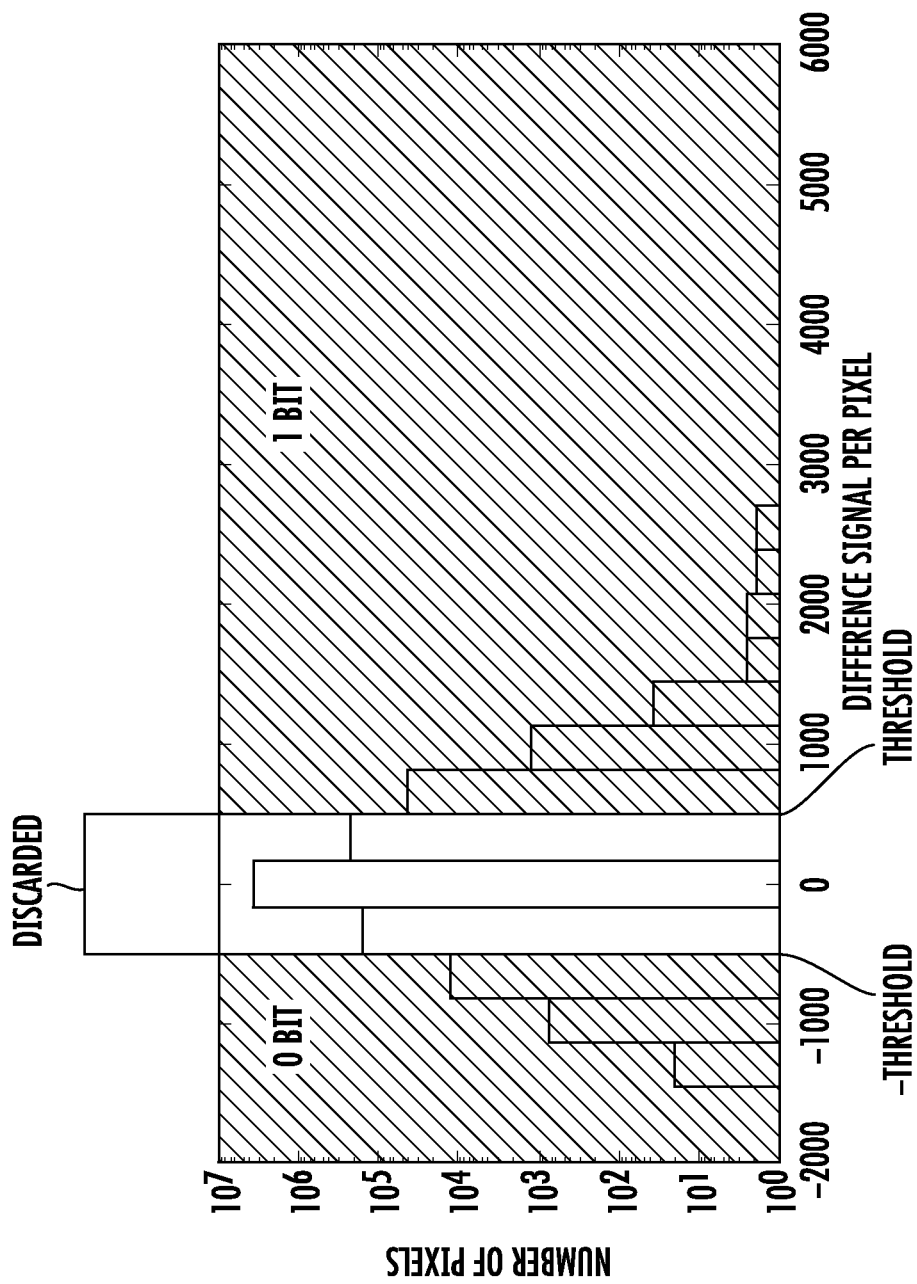
FIG. 4 shows a histogram showing the function of a threshold value in a difference matrix.

FIG. 4 shows a histogram showing the number of pixels as a function of analog value in the difference matrix. As described above, in certain embodiments, the value of each pixel is an analog value. As can be seen, most pixels have a difference value of between −500 and +500.

Since the number of pixels in this range is so large, it can be assumed that noise may cause this variation in the analog values. Consequently, the value of 500 is determined to be the positive threshold value and the value of −500 is determined to be the negative threshold value. Note that the positive and negative threshold values need not be additive inverses in all embodiments. Further, the range of values between the negative threshold value and the positive threshold value may be referred to as the threshold range. In one embodiment, all pixels that have an analog value between the positive and negative values of the threshold are discarded. Pixels having values that are more negative than the negative threshold value may be assigned a value of "0", while pixels having values that are more positive than the positive threshold value are assigned a value of "1". Thus, it is assumed that if the value of a particular pixel in the difference matrix is within the threshold range, it is assumed that pixel was equally affected by the two sets of photon emissions. This may be because the pixel was not affected by either set of photon emissions, or was affected by both sets of photon emissions. Thus, as described above, the pixel is discarded when determining the bit pattern created by the two sets of photon emissions.

Thus, in one embodiment, the system includes a radioactive source 100, a detector 200 and a processor 300. The detector 200 is used to create a splatter pattern whenever a photon is emitted by the radioactive source 100. The processor 300 is used to read the splatter pattern from the detector 200. As stated above, the act of reading the splatter pattern may cause the pixels to return to their default value. In other embodiments, the processor 300 may explicitly reset the values of each pixel after reading its value. At a later time, the processor 300 reads a second splatter pattern from the detector 200. The difference between these two splatter patterns is used to create the random number.

It is important to note that the timing interval used by the processor 300 between successive reads of the detector 200 is arbitrary and not limited by this disclosure. For example, it is possible that multiple photon emissions occurred between the reading of the first splatter pattern and the reading of the second splatter pattern. However, in certain embodiments, the time interval between successive reads is set to a value that is greater than the average time between photon emissions. Therefore, as stated above, each splatter pattern may include the effects of a single photon emission, or may include the effects of a set of photon emissions. This depends on the time interval that is used between successive reads and the emission rate of the radioactive source 100. Thus, it is understood that a splatter pattern is not limited to a single photon emission and may include a set of photon emissions.

Furthermore, in certain embodiments, a shutter 150 is used. The shutter may be used to shield the detector 200 from the radioactive source 100. For example, the shutter 150 may be moved to an open position where the photon strikes the detector 200. After a predetermined amount of time, the shutter 150 is moved to a closed position where photons cannot reach the detector 200. After moving the shutter 150 to the closed position, the detector 200 is read by the processor 300. After the processor 300 has completed reading the detector 200, the shutter 150 may be moved back to the open position for a predetermined amount of time. After the predetermined amount of time, the shutter 150 is moved to the closed position, and the processor 300 reads the detector 200.

However, in other embodiments, a shutter 150 is not used. In this embodiment, the processor 300 simply reads the detector 200 at predetermined intervals.

Further, while the above disclose describes a predetermined time interval between successive reads, it is important to note that the time between successive reads need not be constant.

Figure 5:
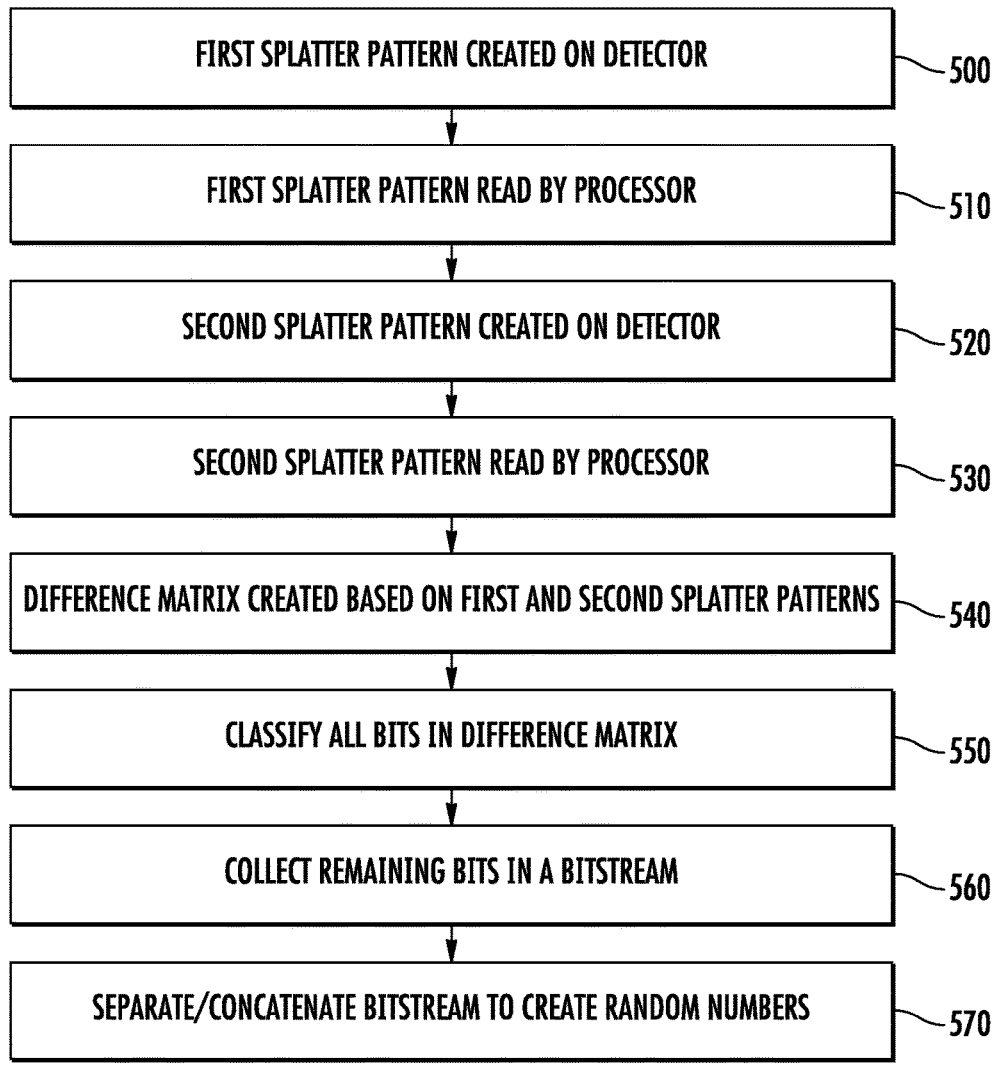
FIG. 5 shows a method of creating random numbers according to one embodiment.

Thus, the method, as shown in FIG. 5, comprises allowing a detector 200 to be impacted by a photon from a radioactive source 100, such that a first splatter pattern is created on the detector 200, as shown in Box 500. The first splatter pattern is then read by the processor 300 and saved in memory, as shown in Box 510. The method also comprises allowing the detector 200 to be impacted by a second photon from the radioactive source 100, to create a second splatter pattern on the detector 200, as shown in Box 520. The processor 300 then reads the second splatter pattern, as shown in Box 530. The processor then performs a pixel-by-pixel comparison of the first and second splatter patterns to create a difference matrix, as shown in Box 540. The processor then classifies all pixels in the difference matrix, as shown in Box 550. For example, pixels with the same value, or values within a threshold range, for both splatter patterns are discarded, while the pixels where different values were present in the two splatter patterns are kept and assigned a binary value of "0" or "1". These remaining bits are then collected as a bit stream, as shown in Box 560. For example, the remaining bits may be read left-to-right and the then top-to-bottom to form a bit stream. Two examples of this were given in FIGS. 2A-2C and 3A-3C.

In some embodiments, this bit stream may be in excess of one thousand bits. In this scenario, the bit stream can then be separated into a plurality of smaller sized random numbers, such as 8 bit numbers, 16 bit numbers, 128 bit numbers, or any other desired size, as shown in Box 570. Further, in certain embodiments, bitstreams from different difference matrices can be concatenated, if desired. If additional bits are desired, all of the steps in FIG. 5 may be repeated.

Thus, the random numbers are generated based on a difference between two splatter patterns, where each splatter pattern is generated by a photon emission from the radioactive source.

Figure 6:
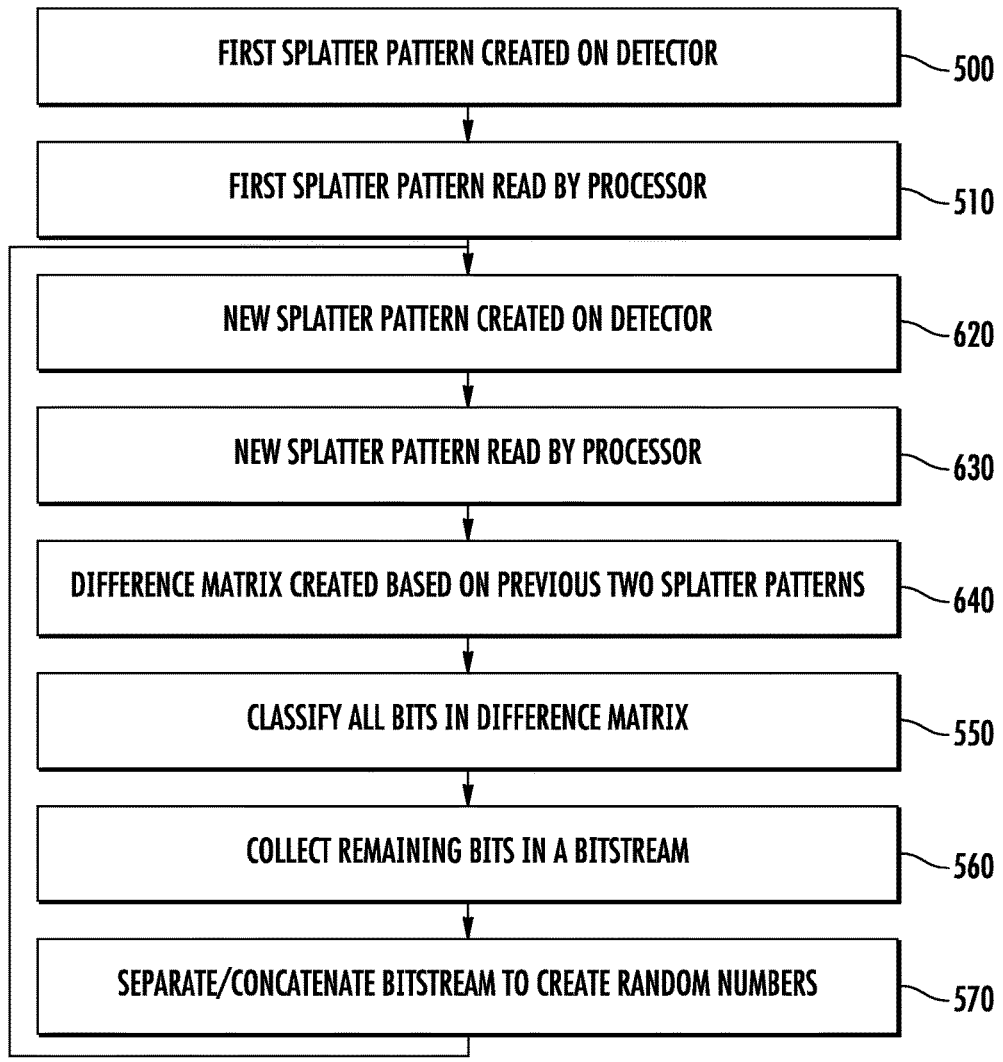
FIG. 6 shows a method of creating random numbers according to another embodiment.

While FIG. 2 shows one method in which random numbers can be generated, other methods may be used. For example, each splatter pattern may be used in two difference matrices, as shown in FIG. 6. This method is similar to that shown in FIG. 5. As such, similarly numbered Boxes will not be described again. In this embodiment, the processor compares the previous two splatter patterns to create the difference matrix, as shown in Box 640. After the method is completed once and random numbers are created, as shown in Box 570, the process is continued by allowing a new splatter pattern to be created on the detector 200, as shown in Box 620. This new splatter pattern is then read by the processor, as shown in Box 630. This new splatter pattern is then compared with the previous splatter pattern, which was previously captured in Boxes 620-630 when the sequence was last executed. In other words, the first difference matrix is a difference between a first splatter pattern and a second splatter pattern, while the second difference matrix is a difference between the second splatter pattern and a third splatter pattern.

While the above description indicates that a single bit stream of random numbers is created by the system of FIG. 1, other embodiments are also possible. For example, the system of FIG. 1 may be used to supply unique random numbers to a plurality of different users 360. These numbers may be generated in a number of ways.

For example, the random numbers to be sent to each user 360 may be separated temporally. In other words, the first difference matrix may be used to supply random numbers to a first user, while the second difference matrix is used to supply random numbers to a second user. This technique may be extended to an arbitrary number of users.

In another embodiment, these numbers may be separated spatially. In other words, rather than using the entire detector 200 to generate a single bit stream, the detector 200 may be subdivided into smaller regions, where each region is associated with a unique user 360. A simple illustration of this embodiment may be achieved by dividing the detector 200 into a plurality of horizontal stripes. For example, if the detector 200 includes 2048×2048 pixels, each horizontal stripe may be 512×2048 pixels. In this embodiment, four separate bit streams may be created, where each bit stream is associated with a unique user. Of course, the detector 200 may be divided into more, less or differently shaped regions. The use of horizontal regions is only for illustrative purposes and is not intended to limit the disclosure to this embodiment.

Further, the temporal and spatial separations may be combined. For example, eight unique users may be supported if the detector 200 is spatially divided into four regions, and odd numbered difference matrices are used for a first set of four users and even numbered difference matrices are used for a second set of four users.

Thus, the system of FIG. 1 can be used to generate unique random numbers for a plurality of users 360 by dividing the detector 200 temporally and/or spatially, where each user 360 receives a unique bit stream, different from every other user 360.

The above system and method also allows for further randomization of the remaining bits. For example, returning to FIG. 2A-2C, it was described that pixels that were part of the first splatter pattern 400 and not part of the second splatter pattern 410 were denoted as "0". However, in certain embodiments, the value assigned to this pixel may vary as a function of time or difference matrix number. For example, in the first difference matrix, this pixel may be denoted as a "0", but in a second difference matrix, a pixel that is affected by the first set of photon emissions and not affected by the second set of photon emissions may be denoted as a "1". Thus, in certain embodiments, value of the pixel may vary based on which difference matrix is being analyzed. A pixel which would be denoted as a "0" in the first difference matrix (and every odd numbered difference matrix) may be denoted as a "1" in a second difference matrix (and every other even numbered difference matrix). This alternating of the definition of a "0" and "1" between difference matrices may increase the randomization of the resulting bitstreams. Thus, the classification of a pixel as a "0" or a "1" may have a temporal component, such that it changes as a function of difference matrix. Referring to FIGS. 5 and 6, this temporal variation indicates that the classification performed in Box 550 may change as a function of time or as a function of which difference matrix is being created. For example, the sequence of FIG. 5 may include a counter which counts the number of difference matrices that have been generated. Based on that value, the classification may be modified.

Figure 7:
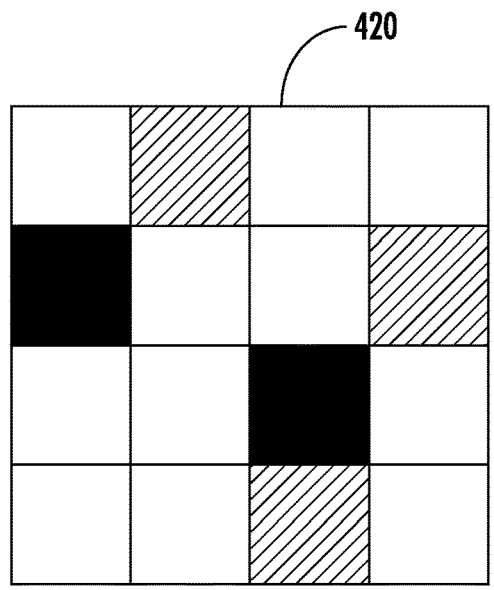
FIG. 7 shows temporal variation of the classification of pixels.

FIG. 7 shows the difference matrix 420 shown in FIG. 2B. All pixels which appeared in the first splatter pattern but not the second splatter pattern were denoted with cross-hatch, while all pixels which appeared in the second splatter pattern but not the first splatter pattern were denoted by black boxes. Previously, it was described that the pixels may be classified such that the cross-hatched pixels are denoted as "0" and the black pixels are denoted as "1". However, in the case of temporal variation, this difference matrix may be either "01010" or "10101", depending on the temporal component. Further, in certain embodiments, the temporal variation is such that the classification of the pixels in Box 550 (see FIG. 5) is changed for each difference matrix. However, other embodiments are also possible, for example, the classification of the pixels may be fixed for "N" difference matrixes and then changed, where N is any number greater than zero.

While the above disclosure describes the classification as being a digital or binary process, it is also possible that this classification can be performed using analog values. For example, in a first difference matrix, values may be determined by subtracting the latter acquired splatter pattern from the earlier acquired splatter pattern. In the second difference matrix, values may be determined by subtracting the earlier acquired splatter pattern from the latter acquired splatter pattern. The resulting analog values may then be converted to digital values as described above with respect to FIG. 4.

Figure 8:
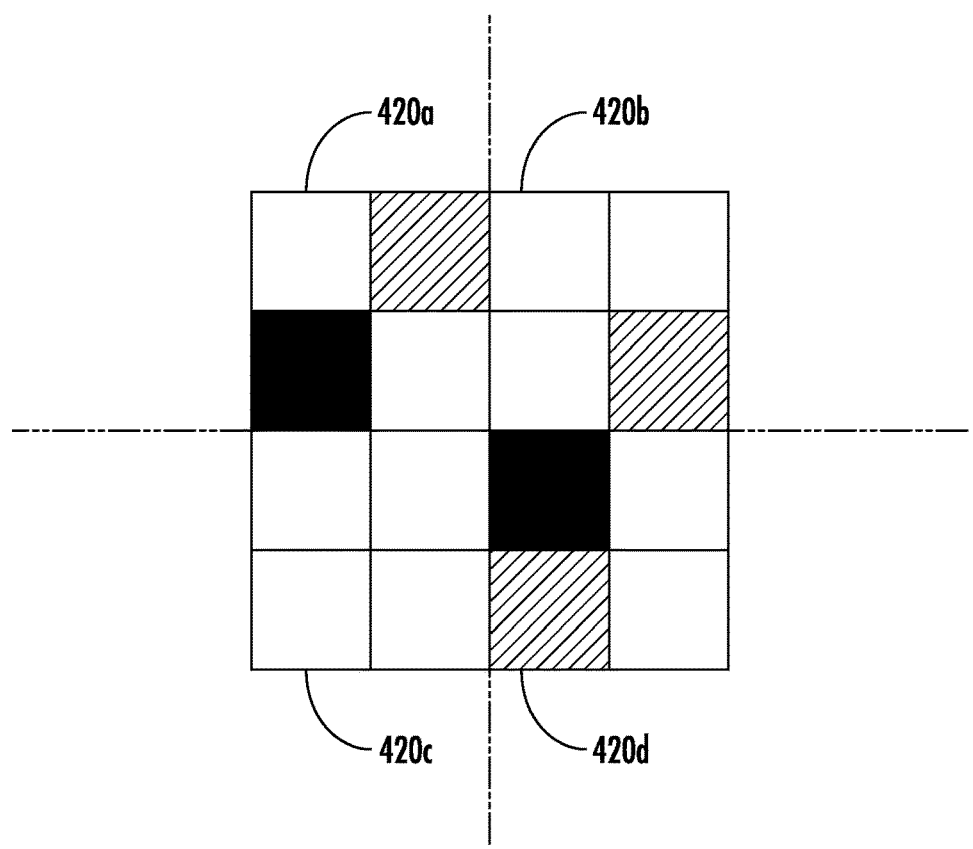
FIG. 8 shows spatial variation of the classification of pixels.

In certain embodiments, the randomization may have a spatial component. Referring to FIG. 8, the difference matrix of FIG. 2B is again shown. Note that the difference matrix 420 may be divided into smaller regions 420a-420d. While FIG. 8 shows the difference matrix 420 divided into four equal sized regions, the disclosure is not limited to this embodiment. The difference matrix may be divided into any number of regions, which may be the same or different sizes. In the case of spatial variation, the classification of the bits in the difference matrix 420 depends on the region in which the bit is located. For example, assume that in regions 420a and 420d, the classification described above is in place. However, in regions 420b and 420c, the opposite classification is in place. In other words, in regions 420b and 420c, the cross-hatched pixels are denoted as "1" and the black pixels are denoted as "0". In this scenario, the bitstream would become "01110". Note that the third bit has changed values since it is in region 420b. This illustration shows that classification is changed for regions that are diagonally opposite each other. However, any spatial variation may be used. For example, only one of the four regions may utilize a different classification scheme. Alternatively, two adjacent regions may employ the same classification scheme, such as 420a-420b.

Again, while the above disclosure describes the classification as being a digital or binary process, it is also possible that this classification can be performed using analog values. For example, in a first set of regions 420a-420d, values may be determined by subtracting the latter acquired splatter pattern from the earlier acquired splatter pattern. In the second set of regions 420a-420d, values may be determined by subtracting the earlier acquired splatter pattern from the latter acquired splatter pattern. The resulting analog values may then be converted to digital values as described above with respect to FIG. 4.

Note that the spatial and temporal variation may be employed simultaneously. This may suppress spatial and temporal correlations in the data. In this embodiment, for example, in the first difference matrix, the cross-hatched and black pixels in regions 420a and 420d are as originally defined, while these definitions are reversed for regions 420b-420c. The definition of the pixels in the next difference matrix would be reversed, implying that cross-hatched pixels are denoted as "1" in regions 420a and 420d, while the black pixels are denoted as "0" in these regions. The remaining two regions 420b-420c would define the pixels in the opposite way. Thus, in a second difference matrix, the bitstream for FIG. 8 would be "10001".

Thus, in summary, temporal variation, spatial variation or both types of variation may be incorporated the classification process shown in Box 550 in FIGS. 5 and 6.

The present system also allows for unique identification of the particular detector that was used to create the random numbers. Specifically, it was disclosed that the bit patterns are created by using only the pixels which had a different value in two different splatter patterns. Any pixel that had the same value in the two splatter patterns was ignored. However, identification information is contained in those discarded bits.

Obviously, there are two cases where a pixel would have the same value in two different splatter patterns. The first, and most common, is that no electrons were released at that pixel location in either splatter pattern. The second case is that, in both splatter patterns, the pixel registered a non-zero value. A persistent non-zero value may be indicative of a defective pixel. These defective pixels may be generated in several ways. First, there are manufacturing defects which may cause a pixel to be defective. Secondly, pixels may intentionally be damaged, such as by chemical contamination or by radiation, such as protons. Importantly, these defective pixels are repeatable and persistent.

Returning to FIGS. 2A-2B, note that the bottom leftmost pixel is active in both images. This may be indicative of a damaged pixel, which can be used to uniquely identify the defector. Note that the images shown in FIG. 3A-3B are generated using the same detector, since that same pixel is active in both of those images as well. Thus, the pattern of defective pixels in the splatter images may be used to identify the source of the random numbers. There are several ways to uncover the pattern of defective pixels. First, in one embodiment, all the splatter patterns captured are averaged together. Defective pixels will have very high average values. Those pixels that were active in only one or a few splatter patterns will have a much lower average value. Thus, by looking at the value of each pixel in the splatter pattern averaged over a plurality of splatter patterns, the pattern of defective pixels can be found. In a second embodiment, Boolean logic may be used. The binary value of each pixel in a splatter pattern may be logically ANDED with the corresponding pixel in a second splatter pattern. Those pixels which were deemed to be a "1" in both splatter patterns will have a value of "1", while all other pixels will have a value of "0". This AND function may be performed on an arbitrary number of splatter patterns to eliminate false positives.

Therefore, in certain embodiments, the detector 200 and the user 360 are spatially separate. The user 360 may also have a processing unit 370 so as to perform the functions described herein. The processing unit 370 may be similar in structure to that described for processor 300. The output of the processor 300 is transmitted to the processing unit 370 at the user 360, such as via the internet, a private network, a satellite or cellular network. The output from the processor 300 may include a bit stream containing random numbers as described above. The output from the processor 300 may also include an identification indicia of the detector 200.

The processing unit 370 at the user 360, upon receipt of the output from the processor 300 is able to verify the identity of the detector 200 based on information received from the processor 300.

For example, in one embodiment, the processor 300 transmits two or more splatter patterns to the user 360. The processing unit 370 at the user 360 is able to identify the detector 200 by isolating the pixels in the splatter patterns that are always active, as described above.

In the case where two or more users 360 are being supplied random numbers from the same detector 200, several approaches may be used. In the case of temporal separation, as described above, each user 360 may receive different splatter patterns from the processor 300. However, since the active pixels are static, these different splatter patterns will generate the same unique identifier for the detector 200. In the case of spatial separation, each user 360 may also receive the splatter patterns associated with the regions of the detector 200 which are used to generate the random numbers for that user. Thus, in the embodiment where the detector 200 is divided into four horizontal regions, user of the four users 360 may only receive the splatter patterns for their respective regions of the detector 200.

In certain embodiments, it may be beneficial to encode the splatter patterns being transmitted to the user 360. This may be done in a variety of ways. For example, if the detector 200 is a CCD or CMOS detector, there are a number of mechanisms that may be used. For example, a CCD or CMOS detector may contain extra pixels at the beginning and end of each row and column. These extra pixels may be used to compensate for bias level variations. However, in certain embodiments, these extras pixels, also known as overclock pixels, may be transmitted with the splatter patterns. Further, the number of overclock pixels that are transmitted per row may be varied during the splatter pattern, or may vary for each splatter pattern. Thus, the use of overclock pixels allows the introduction of spatial encoding by inserting pixels which are not part of the splatter pattern.

In another embodiment, the timing of the splatter pattern may be varied. For example, the serial clock frequency, which is used to clock the pixels from the row shift register, may be varied. This frequency may be changed for each splatter pattern. In certain embodiments, the frequency may be varied for each row, or even varied during a row. Thus, this allows the introduction of temporal encoding of the splatter pattern.

Of course, other methods of encoding the splatter patterns may also be employed. The user 360 and the detector 200 must utilize the same encoding scheme so that the user 360 can decode the splatter patterns and correctly identify the detector 200.

Figure 9:
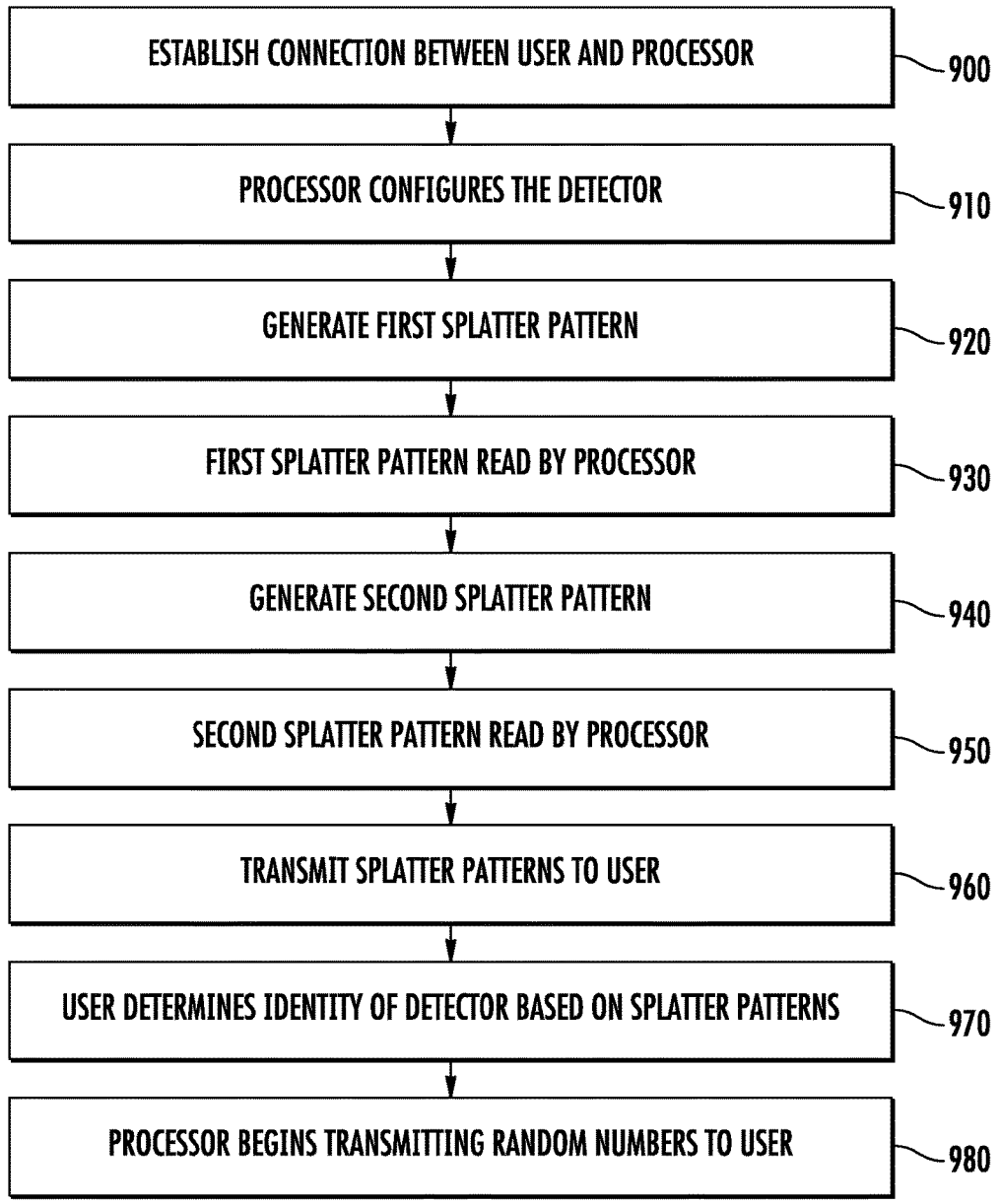
FIG. 9 shows a flowchart of a user validating the identity of the detector.

FIG. 9 shows a flowchart illustrating the process of validating a detector 200 by the remote user 360. First, a connection is made between the user 360 and the processor 300, as shown in Box 900. Next, the user 360 may validate the detector 200. This is done by performing the operations shown in Boxes 910-950. First, in Box 910, the processor 300 may optionally configure the detector 200 to incorporate overclock pixels and may select a particular serial clock frequency. If it is not imperative that the identity of the detector 200 may encoded, Box 910 may be omitted. In Box 920, a first splatter pattern is generated on the detector 200. In Box 930, this first splatter pattern is read by the processor 300. In Box 940, a second splatter pattern is generated on the detector 200. In Box 950, this second splatter pattern is read by the processor 300. These two splatter patterns, or portions thereof, are then transmitted from the processor 300 to the user 360, as shown in Box 960. In Box 970, the user 360 then determines the identity of the detector. The user may first decode the two splatter patterns (if they were previously encoded). The user then averages the values of each pixel in the two splatter patterns, or uses a Boolean AND function to determine which pixels are active in all of the splatter patterns. From this, the user can uniquely identify the detector. Once the user validates the detector, it can then receive random numbers from the processor 300, as shown in Box 980.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure.

Furthermore, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes.

Accordingly, the claims set forth below should be construed in view of the full breadth and spirit of the present disclosure as described herein.

What is claimed is:

1. A system for generating random numbers, comprising:
   a radioactive source;
   a detector to receive photon emissions from the radioactive source, wherein the photon emissions create splatter patterns on the detector; and
   a processor, configured to read a first splatter pattern and a second splatter pattern from the detector, compare the first splatter pattern to the second splatter pattern and create random numbers based on the comparison, and wherein the first splatter pattern and the second splatter pattern are used to uniquely identify the detector.

2. The system of claim 1, where the processor generates the random numbers based on a difference between the first splatter pattern and the second splatter pattern.

3. The system of claim 2, wherein pixels that are active in the first splatter pattern and not active in the second splatter pattern are assigned a first value and pixels that are active in the second splatter pattern and not active in the first splatter pattern are assigned a different second value.

4. The system of claim 3, wherein the first value and the different second value change as a function of time.

5. The system of claim 3, wherein the first value and the different second value are determined based on a spatial location of the pixel in the detector.

6. The system of claim 5, wherein the first value and the different second value change as a function of time.

7. The system of claim 2, wherein pixels that are active in both the first splatter pattern and the second splatter pattern and pixels that are inactive in both the first splatter pattern and the second splatter pattern are not used to create the random numbers.

8. The system of claim 1, wherein pixels that are active in both the first splatter pattern and the second splatter pattern are used to uniquely identify the detector.

9. A system for generating random numbers, comprising:
a radioactive source;
a detector to receive photon emissions from the radioactive source, wherein the photon emissions create splatter patterns on the detector;
a processor in communication with the detector; and
a user, spatially separated from the processor and the detector, wherein the processor transmits the splatter patterns to the user, and wherein the user validates an identity of the detector based on the splatter patterns.

10. The system of claim 9, wherein the splatter patterns are encoded when transmitted from the processor to the user.

11. The system of claim 9, wherein the splatter patterns are spatially encoded by introducing extra pixels to the splatter patterns.

12. The system of claim 9, wherein the splatter patterns are temporally encoded by varying a frequency at which pixels are read from the detector.

13. The system of claim 9, wherein the user determines the identity of the detector based on pixels that are active in two splatter patterns.

14. A method of generating random numbers, comprising:
emitting a photon toward a detector;
using a processor to read two splatter patterns from the detector, each of the two splatter patterns generated by a respective photon striking the detector;
generating random numbers based on a difference between the two splatter patterns; and
transmitting a first and a second splatter pattern from the processor to a remote user, wherein the remote user identifies the detector based on the first and second splatter patterns.

15. The method of claim 14, wherein the first and second splatter patterns are encoded prior to being transmitted to the remote user.

16. The method of claim 14, further comprising transmitting the random numbers from the processor to the remote user after the remote user validates an identity of the detector.

17. The method of claim 14, further comprising transmitting a third and a fourth splatter pattern from the processor to a second remote user, wherein the second remote user identifies the detector based on the third and fourth splatter patterns.

18. The method of claim 17, wherein the third and fourth splatter patterns are different than the first and second splatter patterns, but identify the same detector.

* * * * *